United States Patent
Hwang et al.

(10) Patent No.: US 7,914,762 B2
(45) Date of Patent: Mar. 29, 2011

(54) PREPARATION METHOD OF CHALCOPYRITE-TYPE COMPOUNDS WITH MICROWAVE IRRADIATION

(75) Inventors: Young Kyu Hwang, Taejeon-si (KR); Jong-San Chang, Taejeon-si (KR); Sung Hwa Jhung, Taejeon-si (KR); Jin-Soo Hwang, Taejeon-si (KR); Hye-Young Lee, Busan (KR)

(73) Assignee: Korea Research Institute of Chemical Technology, Jang-Dong Yusung-Gu, Taejeong-Si (KR)

( * ) Notice: Subject to any disclaimer, the term of this patent is extended or adjusted under 35 U.S.C. 154(b) by 0 days.

(21) Appl. No.: 12/680,434

(22) PCT Filed: Sep. 28, 2007

(86) PCT No.: PCT/KR2008/001762
§ 371 (c)(1), (2), (4) Date: Mar. 26, 2010

(87) PCT Pub. No.: WO2009/041758
PCT Pub. Date: Apr. 2, 2009

(65) Prior Publication Data
US 2010/0260661 A1    Oct. 14, 2010

(30) Foreign Application Priority Data

Sep. 28, 2007  (KR) .................. 10-2007-0097697
Oct. 29, 2007  (KR) .................. 10-2007-0108908

(51) Int. Cl.
*C01B 17/00* (2006.01)
*C01B 19/00* (2006.01)
*C01G 3/00* (2006.01)
*C01G 15/00* (2006.01)

(52) U.S. Cl. .......... 423/508; 423/511; 423/23; 977/777; 977/813; 252/62.3 GA; 252/62.3 V (58) Field of Classification Search .................. 423/508, 423/511, 23; 977/813, 777; 252/62.3 GA, 252/62.3 V
See application file for complete search history.

(56) References Cited

U.S. PATENT DOCUMENTS 5,045,409 A    9/1991  Eberspacher et al.
5,356,839 A   10/1994  Tuttle et al.
(Continued)

FOREIGN PATENT DOCUMENTS
EP    1833096 A1    9/2007
(Continued)

OTHER PUBLICATIONS

Park, J.W. et al., "Effect of hydrogen in the selenizing atmosphere on the properties of CuInSe2 thin film," Thin Solid Park, Films, 245, (1994), pp. 174-179.
(Continued)

*Primary Examiner* — Timothy C Vanoy
(74) *Attorney, Agent, or Firm* — Fredrickson & Byron, P.A.

(57) ABSTRACT

A method for preparing a chalcopyrite-type semiconductor compound which is widely used as a sunlight-absorbing material. More specifically, disclosed is a method for preparing a chalcopyrite-type compound, in which microwaves are used as heat sources in the preparation of the chalcopyrite-type compound, and the chalcopyrite-type compound can be produced in a large amount in a short reaction time using a batch or continuous reactor.

14 Claims, 4 Drawing Sheets

U.S. PATENT DOCUMENTS

| | | | |
|---|---|---|---|
| 2003/0226498 | A1 | 12/2003 | Alivisatos et al. |
| 2007/0012183 | A1* | 1/2007 | Jhung et al. ............... 95/54 |
| 2007/0014715 | A1 | 1/2007 | Chang et al. |
| 2009/0317939 | A1* | 12/2009 | Huang et al. ............... 438/82 |
| 2010/0133479 | A1* | 6/2010 | Huang et al. ............... 252/501.1 |

FOREIGN PATENT DOCUMENTS

| | | |
|---|---|---|
| JP | 2006332440 A | 12/2006 |
| KR | 1020050037495 A | 4/2005 |
| KR | 100627634 B1 | 9/2006 |
| KR | 100693126 B1 | 3/2007 |
| KR | 1020070073170 A | 7/2007 |

OTHER PUBLICATIONS

Castro, S.L. et al., "Nanocrystalline Chalcopyrite Materials (CuInS2 and CuInSe2) via Low-Temperature Pyrolysis of Molecular Single-Source Precursors," Chem. Mater. 2003, 15, pp. 3142-3147.

Uruichi, J. et al., "Charge-transfer salts of M(mnt)2(M=Ni,Pd,Pt,Au) with BDNT: ferromagnetic interactions in conductive (BDNT)2-[Ni(mnt)2]," J. Mater. Chem. 1998, 8(1), pp. 141-146.

Li, B. et al., "Synthesis by a Solvothermal Route and Characterization of CuInSe2 Nanowhiskers and Nanoparticles," Adv. Mater. (1999), 11, pp. 1456-1459.

Yang, Y. et al., "Solvothermal Preparation and Spectroscopic Characterization of Copper Indium Diselenide Nanorods," J. Phys. Chem. B 2006, 110, pp. 17370-17374.

Grisaru, H., et a., "Microwave-Assisted Polyol Synthesis of CuInTe2 and CuInSe2 Nanoparticles," Inorg. Chem. 2003, 42, pp. 7148-7155.

"PCT International Search Report dated Jul. 28, 2008 for PCT/KR2008/001762, from which the instant application is based," 4 pgs.

"PCT Written Opinion datd Jul. 23, 2008 for PCT/KR2008/001762, from which the instant application is based," 4 pgs.

\* cited by examiner

PREPARATION METHOD OF CHALCOPYRITE-TYPE COMPOUNDS WITH MICROWAVE IRRADIATION

CROSS-REFERENCE TO RELATED APPLICATIONS

This application is a 35 U.S.C. 371 national stage filing from International Application No. PCT/KR2008/001762 filed Mar. 28, 2008, which claims priority to Korean Application No. 10-2007-0108908 filed Oct. 29, 2007 and to Korean Application No. 10-2007-0097697 filed Sep. 28, 2007, the teachings of all of which are incorporated herein by reference.

TECHNICAL FIELD

The present invention relates to a method for preparing a chalcopyrite-type compound, which is commonly used as a sunlight-absorbing material or the like.

BACKGROUND OF THE INVENTION $CuInSe_2$ (CIS), which is a typical chalcopyrite, has a very high solar cell efficiency up to 17% and has generally been prepared through high vacuum process fabricating thin films, including selenization processes, which comprise vacuum deposition, the decomposition and deposition of organometallic compounds, electrochemical deposition or sputtering, or solid phase reactions, which requires a high synthetic temperature higher than 600° C. (U.S. Pat. Nos. 5,356,839 and 5,045,409; Thin Solid Films 1994, 245,174, Chem. Mater. 2003, 15, 3142). However, these methods have problems which includes expensive equipment and high energy costs.

Carmalt et al. could obtain $CuInSe_2$ at a relatively low temperature after carrying out a reflux reaction for 72 hours. However, in this method the heat treatment at a temperature higher than 500° C. must necessarily be carried out in order to obtain crystalline $CuInSe_2$ (J. Mater. Chem. 1998, 8 2209).

Li, Yang, Chun et al. reported that CIS particles were synthesized at low temperature through a solvothermal method from copper dichloride ($CuCl_2$), indium trichloride ($InCl_3$) and selenium (Se) powders as raw materials using an amine compound as a solvent or a chelating agent (Adv. Mater. 1999, 11, 1456, J. Phy. Chem. 2006, 110, 17370; Korean Patent Laid-Open Publication No. 10-2005-0037495). However, this method needs long reaction time (more than 12 hours) and the CuSe and Se powders remain in trace amounts.

A reflux reaction method that uses microwaves as a heat source in the solvothermal synthesis of CIS was reported (Inorg. Chem. 2003, 42, 7148). In this method, even though the reaction is completed within a short synthesis time (1 hour), CuSe-associated impurities remain and the crystallinity of the product is relatively low, and there is a limitation in carrying out a continuous preparation process commercially producing CIS. In addition, even though polyol, used as a reaction solvent in this method, it is generally used as a reducing agent and it can cause oxidation of CIS, because it contains oxygen in the molecule.

Thus, there is a general need for a method of preparing chalcopyrite-type compound that avoids or solves one or more of the above-mentioned problem of prior art methods. There is particular need for a method of preparing chalcopyrite-type compounds having high crystallinity and/or little or no impurities. For purposes of process efficiencies, there is also need for a method of preparing chalcopyrite-type compound having a short reaction time and little to no unreacted materials

SUMMARY OF THE INVENTION

In an embodiment of the present invention is provided a method for preparing a chalcopyrite-type compound. The compound may have high crystallinity and little or no impurities.

In another embodiment of the invention, a method is provided for preparing a pure chalcopyrite-type compound comprising Cu, a group III element and a group VI element, in which the solubility of reactants (including a Cu salt, a group III element salt and a group VI element powder), is increased during the preparation of the chalcopyrite-type compound, so that the chalcopyrite-type compound contains no unreacted materials or oxides.

In a further embodiment of the present invention is provided a method for preparing a chalcopyrite-type compound, in which no unreacted materials remain and the reaction time is short, and thus the chalcopyrite-type compound can be efficiently produced at high purity in a large amount.

In still a further embodiment of the invention, a method for preparing a chalcopyrite-type compound represented by the following Formula 1, $CuM^1M^2{}_2$, is provided. The method of this embodiment comprises mixing a Cu salt, a group III element salt and a group VI element powder with a chelating agent, an ionic liquid or a chelating agent-ionic liquid mixture and then heating the mixture solution by microwave irradiation. With reference to the formula, $CuM^1M^2{}_2$, $M^1$ is at least one selected from among the group III elements, and $M^2$ is at least one selected from among the group VI elements. The mixture may be formed in a reactor and then irradiated.

Chalcopyrite-type compound, prepared by some embodiments of the preparation method of the present invention, has advantages in that, when the prepared compound is analyzed by XRD, no impurities are detected in the compound, and in addition, the prepared compound has high crystallinity and uniform particle size.

DESCRIPTION OF DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

The following is a list of reference numerals identifying the component to which they refer: 10: reactant drum; 11: slurry feed pump; 20: preheater; 21: pressure indicator; 22: temperature indicator; 30: tubular reactors; 31: microwave ovens; 32: microwaves; 33: temperature indicator and controller; 34: rupture; 37: microwave barrier; 38: sight glass; 39: magnetron; 40: cooler; 41: product drum; 42: pressure indicator and controller; 43: outlet; 44: nitrogen; 45: drain line; and 50: continuous stirred-tank reactor.

DETAILED DESCRIPTION

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

The inventors have made many efforts to solve some of the above-described short comings occurring in the prior art. The inventors have found that with methods according to some embodiments of their invention, they have been able to remarkably increase the solubilities of reactants, including group VI element powder, by introducing a mixture of a Cu salt, a group III element salt, a group VI element powder and a chelating agent into a closed, high-pressure reactor, and then heating the introduced mixture by microwave irradiation. Further, according to some embodiments of the method of the invention, the inventors were able to prepare a pure chalcopyrite-type compound containing no unreacted materials, even though the reaction time was shorter than 1 hour.

In an embodiment of method of the invention for preparing a chalcopyrite-type compound represented by the following Formula 1, the method comprising the steps of a) mixing a Cu salt, a group III element salt and group VI element powder with a chelating agent, an ionic liquid or a chelating agent-ionic liquid mixture; and b) introducing the mixture solution into a reactor and heating the introduced mixture solution by microwave irradiation.

$$CuM^1M^2_2 \quad \text{[Formula 1]}$$

wherein $M^1$ is at least one selected from among the group III elements, and $M^2$ is at least one selected from among the group VI elements.

In the formula 1, $M^1$ is selected from among Ga, In, Tl and mixtures thereof, and $M^2$ is selected from among S, Se, Te and mixtures thereof.

The Cu salt and the group III element salt are not specifically limited, as long as they can be dissolved in a solvent. Halides or hydrates thereof may be used.

The chelating agent may be one or a mixture of two or more selected among the bidentate ligands having a coordination number of 2, and tridentate ligands having a coordination number of 3. The chelating agent serves to stabilize the reactants using the coordinate covalent bond of metal elements and reduce the reaction rate, such that a uniform reaction can occur. Also, it serves as a solvent. It is preferable to use an amine compound having the following formula 2 to help control the reaction rate:

[Formula 2]

wherein R is a straight or branched-chain $C_2$-$C_8$ alkylene and may be substituted with an amino group (—$NH_2$), and the carbon atom of R may be substituted with a nitrogen atom.

The amine compound may be selected among ethylenediamine, 1,3-propanediamine, 1,4-butanediamine, 1,5-pentanediamine, 1,6-hexanediamine, 1,7-heptanediamine, 1,8-octanediamine and diethylenetriamine (($NH_2CH_2CH_2$)$_2$NH).

The ionic liquid may be used as a solvent in the present invention, because it has high solvent power and selectively absorbs microwaves. It is thought that the constituting elements of a compound forming the ionic liquid enhances the ionic character for $Cu^{2+}$ and $InSe_2^-$, which are the counter ions of the chalcopyrite compound, so as to reduce the contact frequency between the ions of the chalcopyrite compound, thus serving as a chelating agent, such as amine.

Generally, the ionic liquid is a salt, which melts at a relatively low temperature and has non-molecular ionic properties. It remains as a liquid at a relatively low temperature, i.e., temperature ranging from room temperature to 200° C., and has a relatively low viscosity, even when it melts. The ionic liquid may be at least one selected among imidazolium, pyrazolium, triazolium, thiazolium, oxazolium, pyridazinium, pyrimidinium, pyrazinium, ammonium, phosphonium, sulfonium, pyridinium and pyrrolidinium salts, which are non-substituted or substituted with an alkyl group having 1-15 carbon atoms. The anion of the ionic liquid forming the salt is not specifically limited, and examples thereof include halides (F$^-$, Cl$^-$, Br$^-$ and I$^-$), acetate (CH$_3$COO$^-$), trifluoroacetate (CF$_3$COO$^-$), triflate (CF$_3$SO$_3^-$), sulfate (SO$_4^{2-}$), hydrogen sulfate (HSO$_4^-$), methyl sulfate (CH$_3$OSO$_3^-$), ethyl sulfate (C$_2$H$_5$OSO$_3^-$), sulfite (SO$_3^{2-}$), hydrogen sulfite (HSO$_3^-$), chloroaluminates (AlCl$_4^-$, Al$_2$Cl$_7^-$ and Al$_3$Cl$_{10}^-$), tetrabromoaluminate (AlBr$_4^-$), nitrite (NO$_2^-$), nitrate (NO$_3^-$), dichlorocuprate (CuCl$_2^-$), phosphate (PO$_4^{3-}$), hydrogen phosphate (HPO$_4^{2-}$), dihydrogen phosphate (H$_2$PO$_4^-$), carbonate (CO$_3^{2-}$), hydrogen carbonate (HCO$_3^-$), sulfonate (SO$_3^-$), tosylate (p-CH$_3$C$_6$H$_4$SO$_3^-$) and bis(trifluoromethylsulfonyl) imide ((CF$_3$SO$_2$)$_2$N$^-$).

An alcoholic solvent may further be added to the mixture. The use of the alcoholic solvent has advantages in that it can control the rate of the microwave reaction and control the shape of the prepared chalcopyrite-type compound. The alcoholic solvent may be a monoalcohol having one hydroxyl group, a diol compound having two hydroxyl groups, or a mixture thereof. Examples of the monoalcohol may include ethanol, methanol, isopropanol and the like, and examples of the diol compound may include ethylene glycol, 1,3-propanediol, 1,2-propanediol, 1,4-butanediol, 1,2-hexanediol, 1,3-hexanediol, 2-ethyl-1,3-hexanediol, 3-chloro-1,2-propanediol, 1-buten-1,4-diol, 1,2-octanediol, 7-octen-1,2-diol, 1,2-cyclohexanediol, 1,3-cyclohexanediol, 1,2-cyclopentanediol, 1,3-cyclopentanediol and the like.

In the step b), it is preferable to introduce the mixture into the reactor after removing oxygen from the reactor, so that the production of impurities by reaction with oxygen can be suppressed. The method of removing oxygen from the reactor may be, for example, a method of purging the reactor with inert gas, such as nitrogen, helium or argon, or a method of repeatedly purging and pumping the inert gas into the reactor.

The microwaves which are used as a heat source in the high-temperature reaction of preparing the chalcopyrite-type compound in the present invention, are any microwaves having a frequency of 500 MHz-30 GHz can be used to heat the reactants, but it is convenient and efficient to use microwaves having a frequency of 2.54 GHz, which are commonly used in industrial applications. In addition, in high-power systems for mass production, microwaves having a frequency of 915 MHz may also be used.

Although the reaction temperature in the preparation method according to the present invention is not specifically limited to the temperature between 100° C. and 250° C., and more preferably between 120° C. and 220° C. If the reaction temperature is excessively low, it is not effective, because the reaction rate is slow. On the other hand, if the reaction temperature is excessively high, the reaction rate is excessively fast, and thus there is a greater probability that impurities other than CIS will be produced. In this case, the internal pressure in the reactor is increased, and thus the construction of the reactor is not economical. Although the pressure of the reactor is not specifically limited, the synthetic process is preferably carried out at the autogeneous pressure of the reactants at the reaction temperature. Also, for the elimination of oxygen in the reactor and for a continuous reaction, inert gas, such as nitrogen or helium, may be added to the reactor, in which case the reaction may be carried out at high temperature. The pressure of the reactor during the reaction is preferably set within 2-30 atm. If the pressure is less than 2 atm, it is disadvantageous in that the crystallinity of the reactants is reduced, and if the pressure exceeds 30 atm, there is a disadvantage in that the stability of the whole system is difficult to maintain.

The reaction in the step b) may be carried out in a batch or continuous manner using a closed, high-pressure reactor. The batch reactor is suitable for producing a small amount of CIS, because it has low hourly productivity, and the continuous reactor incurs a high investment cost, but is suitable for mass production. The reaction time is preferably about 1 minute to 3 hours for a batch reaction. If the reaction time is excessively long, impurities tend to be incorporated, and if the reaction time is excessively short, the rate of formation of reaction crystals is very low. The reaction time more preferably ranges from 1 minute to 1 hour. The residence time in the continuous reactor preferably ranges from about 1 minute to 1 hour. If the residence time is excessively long, productivity is low and large particles are obtained, and if the residence time is excessively short, the reaction conversion rate is low. The residence time is more preferably 1-20 minutes. The reactants may also be stirred during the batch or continuous reaction, and the stirring speed is preferably 100-1000 rpm.

When the step b) is carried out using a continuous microwave, reactor, it may comprise the steps of: feeding a mixture, obtained by a Cu salt, a group III element salt and a group VI element powder with a chelating agent, either into two or more continuous tubular reactors, or into a continuous stirred-tank reactor; heating the mixture in the tubular reactors or the continuous stirred-tank reactor using microwaves to continuously prepare a chalcopyrite-type compound; and separating a solid and a liquid from the prepared reaction product, and then measuring the remaining gas to control the pressure in the reactor.

Figure 4:
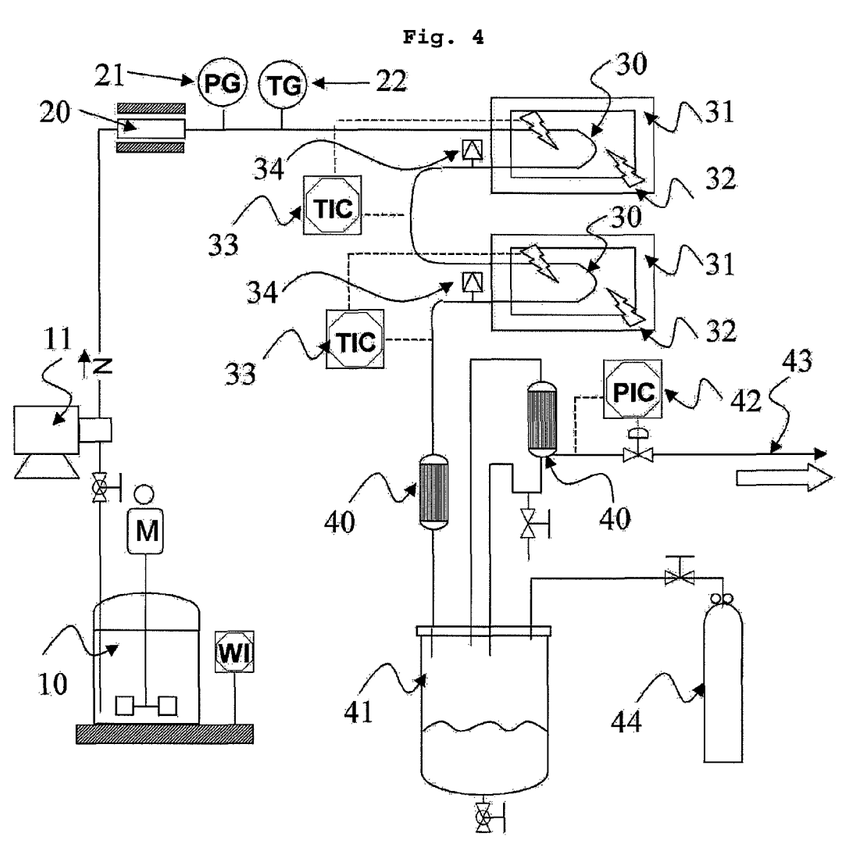
FIG. 4 shows the construction of a microwave reactor system comprising continuous tubular reactors.

An example of the continuous microwave reactor used in the present invention is shown in FIG. 4. which comprises of a continuous tubular reactor, is disclosed in Korean Patent Registration No. 0693126, filed in the name of the present inventors. The continuous microwave reactor system comprises a reactant drum 10 for stirring and storing reactants, a slurry pump 11 for transporting the reactant slurry of the reactant drum, a preheater 20, tubular reactors 30, a temperature indicator and controller 33, a cooler 40, a product drum 41 for storing a product, and a pressure indicator and controller 42. In the reactant drum 10, the raw materials can be metered and stirred, and the reactants can be continuously supplied using the slurry pump 11. The supplied reactants can be preheated to the maximum reaction temperature in the preheater 20 using microwaves or an electric heater. The tubular reactors 30 are made of a material that is permeable to microwaves, such as Teflon or a ceramic material, and is preferably made of Teflon, in view of processability. The tubular reactors 30 can be connected with each other in series in order to increase the residence time, and can be connected in parallel in order to increase productivity. In FIG. 4, two tubular reactors 30 are connected in series, and home microwave ovens 31 are shown as sources providing microwaves 32 to the tubular reactors. When home microwave ovens are used, the microwaves 32 are relatively uniformly distributed in the ovens, and thus microwaves can be evenly irradiated into the tubular reactors. After the completion of the reaction, the product is cooled, the solid and the liquid are collected in the product drum 41, and the gas is vented through the pressure-controlling unit 42. In the case of larger scale production, it is more effective to place a separation tank (not shown) capable of performing solid-liquid separation, in place of the production drum 41, and provide processes, including liquid removal, drying and packaging. In the pressure controlling unit, the pressure of gas can be accurately measured without the interference of a liquid or a solid. This pressure indicates the pressure in the reactor, and thus the pressure in the reactor can be very stably controlled.

The residence time in one reactor is preferably about 1 minute to 1 hour. If the residence time is excessively long, productivity will be low, and if the residence time is excessively short, the reaction conversion rate will be low. The residence time in each reactor is more preferably 1 minute to 20 minutes.

The tubular reactors preferably have no connection in a region which is irradiated with microwaves, and the length of the tubular reactors is preferably 5-100 cm per magnetron (microwave generator). If the length is excessively short, an increased number of reactors is required, leading to inefficiency, and if the length is excessively long, differential pressure tends to form, and the construction of the reactors is inefficient. Two or more tubular reactors can be connected in series or in parallel, and the number of connected tubular reactors is not specifically limited, but is preferably 2-10 minutes in view of efficiency. Because the microwave reaction occurs rapidly, it is preferable to sufficiently stir the reactants before the reaction, and it is particularly preferable to preheat the reactants to a temperature between room temperature and the reaction temperature.

Figure 5:
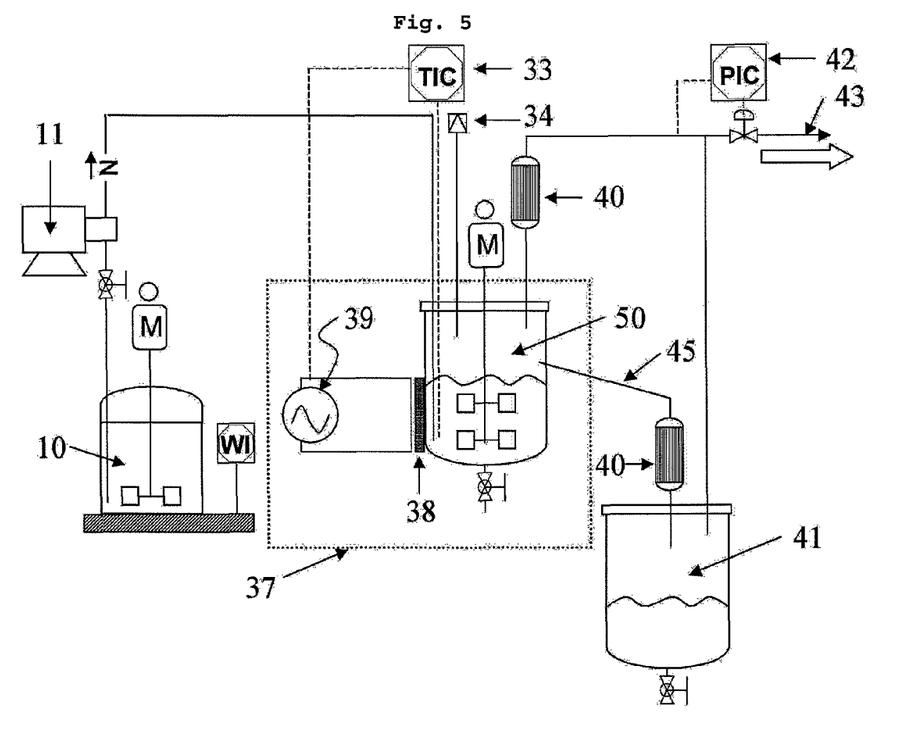
FIG. 5 shows the construction of a microwave reactor system comprising a continuous stirred-tube reactor.

Another example of the continuous microwave reactor used in the present invention is shown in FIG. 5. The microwave reactor system comprising a continuous stirred-tank reactor (CSTR) 50, is disclosed in Korean Patent Registration No. 0627634, filed in the name of the present inventors. In the reactor drum 10 in FIG. 5, the raw materials can be placed and stirred, and the reactants in the reaction drum 10 can be continuously supplied into the continuous stirred-tank reactor 50 using the slurry pump 11. The continuous stirred-tank reactor 50 is made of stainless steel, titanium or hastelloy, or other corrosion resistant metal or metal alloy and is preferably made of stainless steel. In order to irradiate microwaves, a thick sight glass 38, made of a glass, quartz or ceramic material, all of which are permeable to microwaves, is placed in the wall of the continuous stirred-tank reactor 50. With an increase in the capacity of the reactor, the number of sight glasses and the number of magnetrons 39 for producing microwaves can be increased. A microwave barrier 37, such as stainless steel mesh can be installed to prevent microwaves from leaking to the outside of the reactor. A drain line 45 is connected to the side of the continuous stirred-tank reactor 50 at a location having a given height, such that a liquid and a solid are automatically drained, when the level of the reactor increases above a set value. The gas component is passed through a cooler 40, disposed above the reactor, to the pressure indicator and controller 42, and is automatically vented from outlet 43 when the pressure of the reactor is above a set pressure value. A plurality of the continuous stirred-tank reactors 50 may be connected in series in order to increase the residence time or to reduce unreacted components due to the wide distribution of residence times. When pluralities of the reactors are connected with each other, it is preferable to allow the reactants to flow downward.

As described above, the preparation method according to the present invention is a very economical method capable of synthesizing a chalcopyrite-type compound in a very short time using microwave irradiation. This method can also produce large amounts of a chalcopyrite-type (Cu-III-VI$_2$) semiconductor compound in a very short time of less than 5 minutes.

Also, the chalcopyrite-type compound prepared according to the inventive method has advantages in that it has very high purity compared to that of a product prepared according to prior art preparation methods, because the reactant group VI element powder does not remain and byproducts caused by oxygen are not produced, and in that it has high crystallinity and a uniform particle size. Moreover, when the continuous microwave synthetic technology is used, there is an advantage in that the concentration of the product can be increased two-fold or more compared to that in a prior electrical heating method using a solvothermal synthetic process, leading to a significant increase in hourly productivity. In addition, when microwave irradiation is performed, there is an advantage in that pure CIS can be synthesized, because the solubility of Se powder in an amine compound is very high.

Hereinafter, the present invention will be described in further detail with reference to examples. It is to be understood, however, that these examples are illustrative only, and the scope of the present invention is not limited thereto.

EXAMPLE 1

4 g (29.75 mmol) of copper dichloride (CuCl$_2$), 8.8 g (30.01 mmol) of indium trichloride (InCl$_3$ 4H$_2$O) and 4.74 g (60.03 mmol) of selenium powder were added to 500 ml of a mixed solution of ethylenediamine (ED): ethanol (E) (ED:E=3:1 molar ratio). The mixture was introduced into a microwave reactor (CEM, Model Mars-5), from which oxygen has been removed by purging with nitrogen under a nitrogen stream, and was irradiated with microwaves having a frequency of 2.54 GHz to elevate the reaction temperature to 140° C., and the mixture was maintained at autogeneous pressure (about 4 atm) for 5 minutes, so that the mixture in the reactor was allowed to react. Then, the reaction product was cooled to room temperature, centrifuged, washed with ethanol and distilled water, and dried in a nitrogen atmosphere at 80° C., thus preparing a chalcopyrite CuInSe$_2$ compound. The X-ray diffraction pattern of the synthesized powder was analyzed (Rigaku Japan, D/max-A, CuK:=1.54178 Å) and, consistent with JCPDS No. 89-5647 (FIG. 1).

Figure 1:
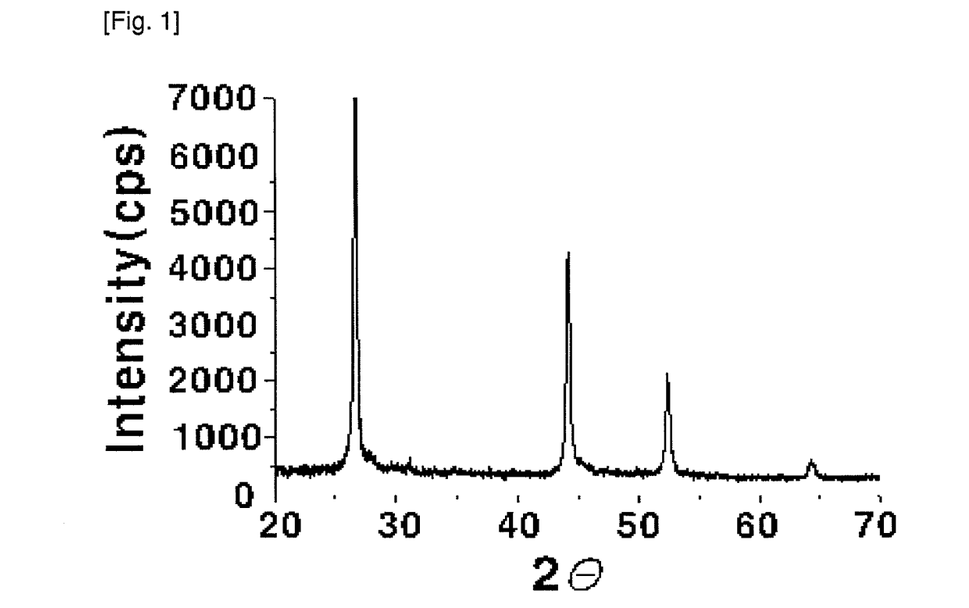
FIG. 1 is the X-ray diffraction pattern of $CuInSe_2$ prepared in Example 1 of the present invention.

As shown in FIG. 1, unreacted Se powder and other impurities were not detected in the CuInSe$_2$ compound in this Example, and the prepared compound had high crystallinity.

EXAMPLE 2

4 g (29.75 mmol) of copper dichloride (CuCl$_2$), 8.8 g (30.01 mmol) of indium trichloride (InCl$_3$4H$_2$O) and 4.74 g (60.03 mmol) of selenium powder were added to 500 ml of ethylenediamine (ED). The mixture was introduced into a microwave reactor (CEM, Model Mars-5), from which oxygen has been removed by purging with nitrogen, under a nitrogen stream, and was irradiated with microwaves having a frequency of 2.54 GHz to elevate the reaction temperature to 180° C., and the mixture was maintained at autogeneous pressure (about 3.5 atm) for 30 minutes, so that the mixture in the reactor was allowed to react. Then, the reaction product was cooled to room temperature, centrifuged, washed with ethanol and distilled water, and dried in a nitrogen atmosphere at 80° C., thus preparing a chalcopyrite CuInSe$_2$ compound. The X-ray diffraction pattern of the synthesized powder was analyzed (Rigaku Japan, D/max-A, CuK:=1.54178 Å) and it was found to be consistent with JCPDS No. 89-5647 (FIG. 2).

Figure 2:
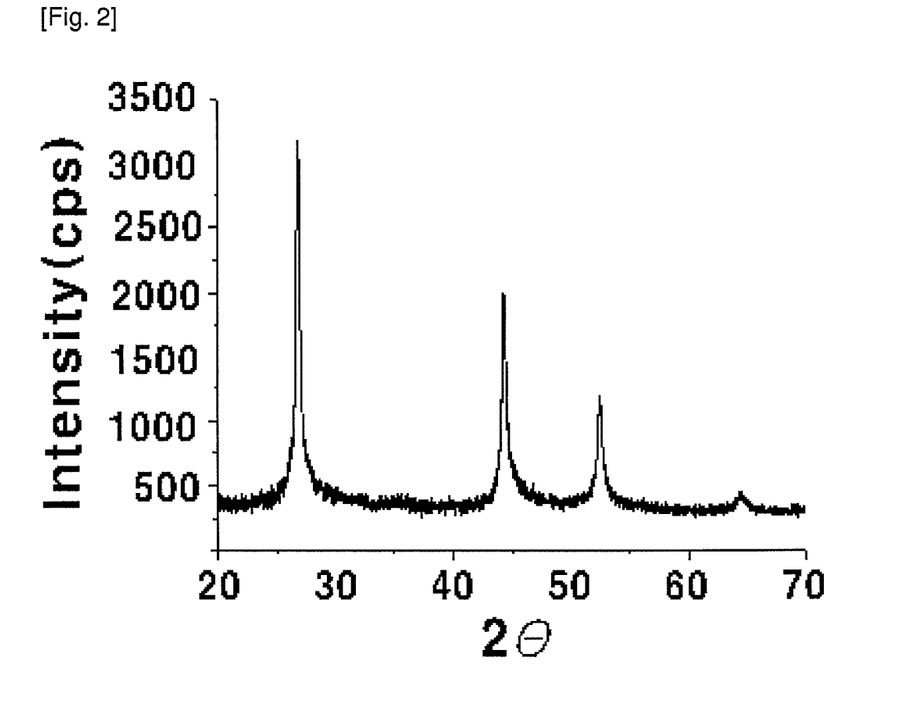
FIG. 2 is the X-ray diffraction pattern of $CuInSe_2$ prepared in Example 2 of the present invention.

As shown in FIG. 2, it could be seen that the CuInSe$_2$ compound prepared in this Example was a nanocrystal having a particle size of 28 nm, as calculated from the full width half max of the XRD peak.

EXAMPLE 3

Figure 3:
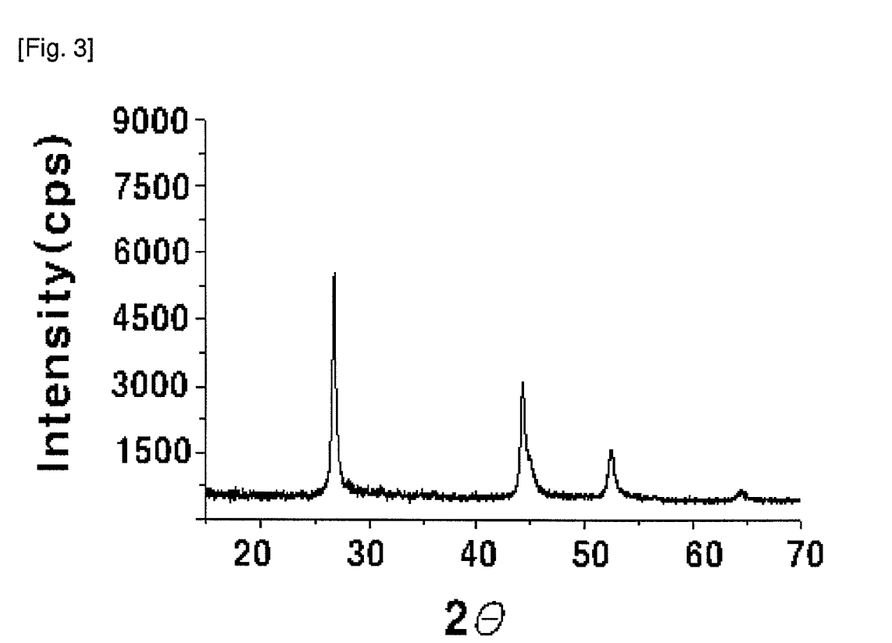
FIG. 3 is the X-ray diffraction pattern of $CuIn_{0.5}Ga_{0.5}Se_2$ prepared in Example 3 of the present invention.

4 g (29.75 mmol) of copper dichloride (CuCl$_2$), 4.398 g (15.00 mmol) of indium trichloride (InCl$_3$4H$_2$O), 1.046 g (15.00 mmol) of Ga and 4.74 g (60.03 mmol) of selenium powder were added to 500 ml of ethylenediamine (ED): ethanol (E) (ED:E=3:1 molar ratio). The mixture was introduced into a microwave reactor (CEM, Model Mars-5), from which oxygen has been removed by purging with nitrogen, under a nitrogen stream, and was irradiated with microwaves having a frequency of 2.54 GHz to elevate the reaction temperature to 180° C., and the mixture was maintained at autogeneous pressure (about 4 atm) for 5 minutes, so that the mixture in the reactor was allowed to react. Then, the reaction product was cooled to room temperature, centrifuged, washed with ethanol and distilled water, and dried in a nitrogen atmosphere at 80° C., thus preparing a chalcopyrite CuIn$_{0.5}$Ga$_{0.5}$Se$_2$ compound. The X-ray diffraction pattern of the synthesized powder was analyzed (Rigaku Japan, D/max-A, CuK:=1.54178 Å) and it was consistent with JCPDS No. 89-5647 (FIG. 3). This result suggests that the metal powders are synthesized in a relatively short time in the microwave irradiation process compared to a conventional electrical heating process.

EXAMPLE 4

A chalcopyrite compound was synthesized in the same manner as in Example 2, except that an ionic liquid, 1-butyl-imidazolium chloride, was used instead of ethylenediamine (ED) as the solvent. The X-ray diffraction pattern of the synthesized powder was analyzed (Rigaku Japan, D/max-A, CuK:=1.54178 Å) and, as a result, it was consistent with JCPDS No. 89-5647.

EXAMPLE 5

Continuous Microwave Reactor System

As a system for preparing a chalcopyrite compound, the continuous microwave reactor shown in FIG. 4 was used. In the reactant drum 10, the reactants were be metered to make a reactant mixture, and the slurry pump 11 was used to transfer the reactant mixture to the preheater 20, the microwave reactor 30, the cooler 40 and the product drum 41. In a portion of the reactor, into which microwaves were not irradiated, a pressure gauge 21 and a thermocouple 22 were placed, such that the temperature and pressure of the reactant or the product could be measured. The reaction temperature could be controlled by controlling the power of microwaves, and a rupture 34 was provided, such that, when a rapid increase in pressure occurred, gas could be automatically vented from the reactor, thus preventing the internal pressure of the reactor from excessively increasing and an explosion from occurring in the reactor. The obtained product could be collected in the product drum 41, the pressure of the reactor was controlled by measuring the pressure of the gas component remaining after the removal of the solid and liquid components of the product, and, when the pressure in the reactor was higher than a set pressure value, gas was discharged outside through the pressure controller 42. In order to perform the reaction in a smooth and stable manner and to prevent the evaporation of the solvent, it is preferable to maintain the reactor pressure at a set pressure value before the start of the reaction, and for this purpose, a nitrogen tank 44 for supplying nitrogen was used. In order to prevent microwaves from leaking from the reactor, a stainless steel mesh was disposed around the reactor.

Preparation of CuInSe$_2$ Compound 4 g (29.75 mmol) of copper dichloride (CuCl$_2$) 8.8 g (30.01 mmol) of indium trichloride (InCl$_3$4H$_2$O), and 4.74 g (60.03 mmol) of selenium (Se) powder were added to 500 ml of ethylenediamine (ED) to prepare a mixture solution. The continuous microwave reactor system was purged with nitrogen to form a nitrogen atmosphere, and in this state, nitrogen was supplied into the microwave reactor 30 to maintain the reactor pressure at 15 atm. Then, the mixture solution was pumped, so that it was continuously supplied from the reactant drum 10 to the microwave reactor 30. The mixture in the reactor was irradiated with microwaves having a frequency of 2.54 GHz to increase the reactor temperature to 180° C., and when the reactor temperature exceeded 4 atm, gas was vented from the reactor so as to maintain the reactor pressure to 4 atm. The residence time in each of the reactors was 5 minutes, and from 5 minutes after the initiation of the reaction, the product was collected in the product drum 41. The product was cooled to room temperature, centrifuged, washed with ethanol and distilled water, and dried in a nitrogen atmosphere at 80° C., thus preparing a chalcopyrite CuInSe$_2$ compound. The X-ray diffraction pattern of the synthesized powder was analyzed (Rigaku Japan, D/max-A, CuK: =1.54178 Å), and, as a result, it was found to be consistent with JCPDS No. 89-5647. Ethylenediamine has advantages in that it can completely dissolve powder such as Se, and thus is advantageous for carrying out a continuous reaction.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the disclosure.

What is claimed:

1. A method for preparing a chalcopyrite-type compound represented by the following formula 1, and the method comprising the steps of:
   a) mixing a Cu salt, a group III element salt and a group VI element powder with a chelating agent, an ionic liquid or a chelating agent/ionic liquid mixture to prepare a mixture solution; and
   b) introducing the mixture solution into a reactor and heating the introduced mixture solution by microwave irradiation:

$$CuM^1M^2_2 \qquad [\text{Formula 1}]$$

wherein M$^1$ is one or more selected from among group III elements, and M$^2$ is one or more selected from among group VI elements.

2. The method of claim 1, wherein M$^1$ is selected among Ga, In, Tl and mixtures thereof, and M$^2$ is selected among S, Se, Te and mixtures thereof.

3. The method of claim 1, wherein the chelating agent is selected from among amine compounds, represented by the following Formula 2, and mixtures thereof:

[Formula 2]

wherein R is a straight or branched-chain C$_2$-C$_8$ alkylene, which may be substituted with an amino group (—NH$_2$), and the carbon atom of R may be substituted with a nitrogen atom.

4. The method of claim 3, wherein the amine compound is selected among ethylenediamine, 1,3-propanediamine, 1,4-butanediamine, 1,5-pentanediamine, 1,6-hexanediamine, 1,7-heptanediamine, 1,8-octanediamine and diethylenetriamine.

5. The method of claim 1, wherein the ionic liquid is one or more selected among imidazolium, pyrazolium, triazolium, thiazolium, oxazolium, pyridazinium, pyrimidinium, pyrazinium, ammonium, phosphonium, sulfonium, pyridinium and pyrrolidinium salts, which are non-substituted or substituted with an alkyl group having 1-15 carbon atoms.

6. The method of claim 1, wherein an alcoholic solvent is further added to the mixture solution.

7. The method of claim 6, wherein the alcoholic solvent is selected among monoalcohols, including ethanol, methanol and isopropanol, diol compounds, including ethylene glycol, 1,3-propanediol, 1,2-propanediol, 1,4-butanediol, 1,2-hexanediol, 1,3-hexanediol, 2-ethyl-1,3-hexanediol, 3-chloro-1,2-propanediol, 1-buten-1,4-diol, 1,2-octanediol, 7-octen-1,2-diol, 1,2-cyclohexanediol, 1,3-cyclohexanediol, 1,2-cyclopentanediol and 1,3-cyclopentanediol, and mixtures thereof.

8. The method of claim 1, wherein the mixture solution in the step (b) is introduced into the reactor under an inert gas stream, after oxygen in the reactor is removed.

9. The method of claim 1, wherein the reactor is a batch or continuous, closed, high-pressure reactor.

10. The method of claim 9, wherein the microwaves in the step (b) are irradiated such that the reaction temperature reaches 100-250° C.

11. The method of claim 10, wherein the pressure of the reactor during the reaction in the step (b) is controlled to 2-30 atm.

12. The method of claim 10, wherein the microwaves in the step b) have a frequency of 500 MHz-30 GHz.

13. The method of claim 10, wherein the reaction time in the step b) ranges from 1 minute to 1 hour.

14. The method of claim 1, wherein, in the step b), the chalcopyrite-type compound is continuously prepared using tubular reactors or a continuous stirred-tank reactor.

* * * * *